United States Patent [19]

Ryckman, Jr.

[11] 4,433,741
[45] Feb. 28, 1984

[54] STRAIN GAGE SCALE

[75] Inventor: William D. Ryckman, Jr., Orange, Conn.

[73] Assignee: General Electric Company, New York, N.Y.

[21] Appl. No.: 367,360

[22] Filed: Apr. 12, 1982

[51] Int. Cl.³ .................. G01G 3/14; G01G 21/23
[52] U.S. Cl. ................... 177/199; 177/211; 177/244
[58] Field of Search ............... 177/211, DIG. 9, 199, 177/238, 244

[56] References Cited

U.S. PATENT DOCUMENTS

| | | | |
|---|---|---|---|
| 2,499,033 | 2/1950 | Oberholtzer | 73/141 |
| 2,899,191 | 8/1959 | Hunt | 177/211 |
| 3,548,650 | 12/1970 | Boadle | 177/211 X |
| 3,831,441 | 8/1974 | Petty | 73/141 A |
| 3,894,594 | 7/1975 | Oejelid | 177/211 |
| 3,938,603 | 2/1976 | Shoberg et al. | 177/211 |
| 4,047,427 | 9/1977 | Young | 177/211 X |
| 4,177,868 | 12/1979 | Sanders | 177/211 |
| 4,355,692 | 10/1982 | Ostrelich | 177/211 |

FOREIGN PATENT DOCUMENTS 2929137  5/1981  Fed. Rep. of Germany ...... 177/211

*Primary Examiner*—Joseph W. Hartary
*Attorney, Agent, or Firm*—John F. Cullen; Leonard J. Platt; George R. Powers

[57] ABSTRACT

In a strain gage weighing scale with a load platform, a plurality of foot structures support the platform. The invention is an improvement in each foot structure of a sandwich with a bottom support plate, a pair of spaced first cylindrical roller fulcrums on the plate, a floating beam plate on the first fulcrums and spaced above and coextensive with the bottom plate. A pair of differently spaced and equally offset second cylindrical roller fulcrums on the beam plate support the platform. Suitable strain gages are secured to the beam any place between the closer pair of fulcrums. The entire sandwich is held together by a deformable plastic housing that secures the plates and fulcrums together and is barb-connected to the platform. The strain gages are connected to conventional converting structure measuring the change in resistance under load and calibrated to read weight. The deformable plastic housing holding the sandwich is an integral molding with structural details reducing friction between the parts. The overall result is a lower profile scale for common household use.

3 Claims, 5 Drawing Figures

STRAIN GAGE SCALE

BACKGROUND OF THE INVENTION

1. Field of the Invention

The invention is directed to a strain gage weighing scale of the type generally found in home bathrooms and which has supporting feet, usually one at each corner, in a substantially square scale. To this type scale, the individual foot structure is improved so that each foot contains one or more strain gages in a combination such that the overall scale has an individual weighing structure at each foot as opposed to the common relatively movable or telescoping load and base platforms with a single beam structure therein. The result is an overall scale that is very thin or low profile to improve over the more bulky scales generally used.

2. Description of the Prior Art

In the common household weighing scales particularly of the bathroom type, it is customary to house weighing structure in a generally square base and to use a movable upper platform cupped over the base and supported on common beam structure and spring within. A convenient dial or digital readout is suitably calibrated to indicate the weight as, for example, in pounds. Such a general type scale is shown in U.S. Pat. No. 4,173,263 of common assignment and the references therein. These are generally the most common and least expensive of the home bathroom type scale. More complex scales use different means to balance the weight such as beams connected to load cells which produce electrical signals that are converted to digital readouts of weight applied as shown in U.S. Pat. No. 3,831,687. Any number of plain load cells also may be placed under platforms as shown in U.S. Pat. No. 2,488,347. Both latter types may use strain gages whose resistance changes as they are stressed and the resulting resistance used by balancing in a Wheatstone bridge or by calibrating any conventional summing circuit to directly read weight—both being strain gage applications that will directly read in weight. Further, scales using integrated circuitry have been designed with responsive tranducers electrically connected to indicate weight. Temperature changes affect the supporting transducers and produce changes in transducer operation particularly in terms of the zero calibration reading. A typical transducer scale of this type is disclosed in now U.S. Pat. No. 4,355,692 dated Oct. 26, 1982 of common assignment. An improved invention to provide a zero calibration and zero error correction arrangement especially helpful in the scale of the type of said '749 application is shown in U.S. Pat. No. 4,313,510 of common assignment.

Generally, the scales thus described may be considered larger and more bulky than desired in some uses. The present invention is directed to an improvement of a strain gage weighing scale using special plural spaced foot structures supporting a low platform, each individual foot structure comprising a sandwich construction that results in an overall combination that is thin or very low profile for a more pleasing and inexpensive bathroom type scale.

SUMMARY OF THE INVENTION

In accordance with the invention, a strain gage weighing scale has a load platform and a plurality of individually spaced foot structures supporting the platform. An improvement in each foot structure includes a sandwich-type construction with a bottom support plate and a pair of first cylindrical parallel rollers or fulcrums on the plate. A floating beam plate is disposed on the first fulcrums and spaced above and it extends substantially coextensive with the bottom support plate. A pair of differently spaced and equally offset second fulcrums of cylindrical rollers is provided on the beam plate directly supporting the load platform. Strain gage means are secured to the upper or lower beam surface of every beam between the closer pair of fulcrums and suitable means such as a Wheatstone bridge or summing circuit is connected to the strain gage means for converting the resistance change of the strain gages under load to read the weight of the load. The entire sandwich structure may be supported in a deformable plastic housing to clamp the plates and fulcrums together to the platform and the housing is so configured that the internal parts are interchangeable. The deformability of the housing permits full load transmittal and low friction by a barb/slot arrangement while holding the sandwich together. Thus, the main object is to provide an overall strain gage weighing scale combination that uses sandwich foot structures at each corner in such a manner that the entire scale is very low profile as an improvement over the more bulky bathroom type scales generally used.

BRIEF DESCRIPTION OF THE DRAWING

Referring to FIG. 1, there is shown a typical overall outline of a common type household bathroom scale from below employing, in this case, a load platform 10 supported by several foot structures 12 spaced around the outline of the scale. In the general configuration this preferably consists of four foot structures 12 in a quadrate pattern or at each peripheral corner of the outline of the scale as shown. For the purpose of weighing, these foot structures are all that is required in the present structure when they are constructed as will be explained. However, for aesthetic purposes the scale may have a decorative cover and suitable readout window on the top of platform 10 which need not be movable and a person merely stands on the scale as indicated by the outlined footprints shown. Thus, the cupping cover overlapping a base of the standard bathroom scale, as shown for example, in U.S. Pat. No. 4,082,154 is not required in the instant scale since platform 10 with supporting feet 12 is, functionally, all that is required.

The present scale is designed as a strain gage weighing scale which, per se, is old as shown in said '154 patent but operates in a much thinner low profile with substantially no moving parts and with high accuracy.

Figure 1:
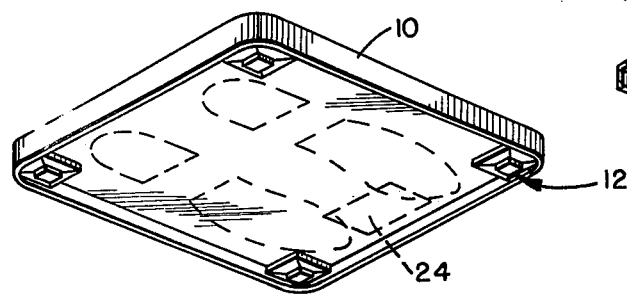
FIG. 1 is a perspective of the load platform from below with parts dotted.

To this end, a plurality of individually spaced foot structures 12 of general sandwich construction are placed as shown in FIG. 1 and the invention resides in the make up of the individual sandwich foot construction in the combination as shown.

Figure 3:
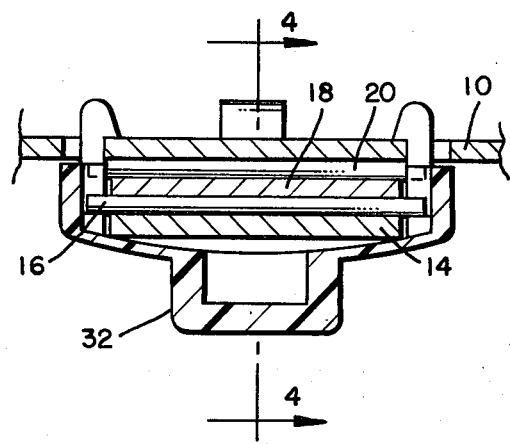
FIG. 3 is a cross-sectional view on line 3—3 of FIG. 5 showing the sandwich construction.
Figure 5:
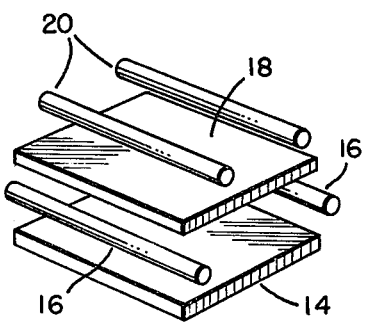
Figure 5:
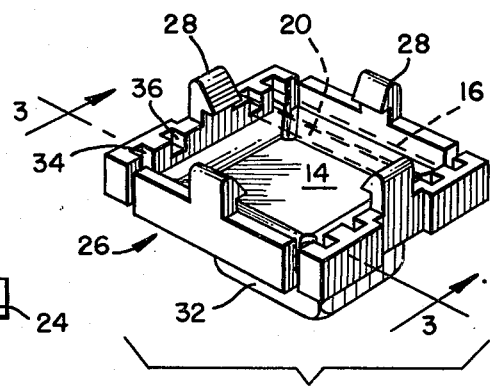
Figure 4:
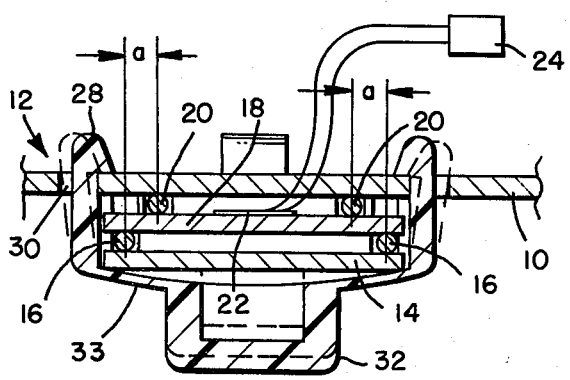
FIG. 4 is a cross-sectional view on line 4—4 of FIG. 3 with a converting means and also showing the housing deformed in dotted lines, and, FIG. 5 is an exploded perspective of the sandwich internals showing some roller fulcrums in phantom for clarity.

For best understanding, reference is made to FIG. 4 where the individual foot structure 12 comprises a sandwich with a bottom support plate 14 that is a substantially square hard metallic plate and is relatively thin as shown. Supported directly on bottom support plate 14 is a pair of spaced first fulcrums 16 that may take suitable form such as triangular fulcrums or flexure plates or any other equivalent. For practical purposes and thin sandwich construction and to equalize the load, the fulcrums are preferably cylindrical elongated parallel rollers 16 as shown in FIG. 5. For weighing, a floating beam plate 18 is disposed to rest on the first fulcrums 16 and is spaced closely above and substantially coextensive with the bottom plate 14. Disposed directly on beam plate 18 is an identical pair of differently spaced second fulcrums 20 equally offset from the first fulcrums 16. These fulcrums 20, are directly on beam plate 18 and support plateform 10 directly above as seen in FIGS. 3 and 4. As clearly shown in FIG. 4, the longitudinal distance between fulcrums 20 is one value while the longitudinal distance between adjacent fulcrums 16 is a different value—thus the meaning of "differently spaced". Additionally, the moment arm "a" between the two sets of fulcrums is made equal. It does not matter whether the horizontal distance between fulcrums 20 is greater or less as shown than the distance between adjacent fulcrums 16 so long as they are different and the length of the moment arms "a" is the same. This is what is meant by "equally offset" in the claims, i.e. the arms "a" are the same.

As will be apparent from FIG. 4, application of load on platform 10 is transmitted through fulcrums 20 to beam 18 and then through fulcrums 16 to bottom support plate 14. As the beam 18 is subjected to opposite moments at each end it is deflected or bends. In order to measure the deflection of beam 18, a conventional strain gage 22, conventionally oriented for maximum response, is secured to either side of the beam 18—one being shown on the top side in FIG. 4. The resistance change in strain gage 22 on deflection of beam plate 18 is directed to a conventional means diagrammatically shown at 24 to convert the change in resistance under load to read the weight of the load in suitable units such as pounds or kilograms.

The particular disposal of the strain gages may be any conventional arrangement and they are connected to converting means 24 to read the weight. For example, with four foot structures 12, the strain gages 22 may be applied both to the top and bottom of beam plates 18 and connected two into each leg of a Wheatstone bridge circuit in a known manner all in converting means 24. They may also be placed on one side only of the beam as shown in FIG. 4 and a suitable summing circuit used. For example, if three foot structures 12 were used it is possible to use a summing circuit or even a Wheatstone bridge with one inactive leg to convert the change in resistance of the strain gages directly into pounds. On the other hand, if four foot structures 12 are used as shown, it is also possible to use a summing circuit if all gages are on one side of the beam or they can be used with two gages on opposite sides of the beam and connected as a Wheatstone bridge. If more than four of the foot structures 12 are used, any summing circuit and/or bridge may be used so long as the response of the weight indicator to a given weight is the same for each foot structure i.e. 10 pounds at any foot will read 10 pounds at the indicator. Suffice to say, a suitable means 24 is selected to convert the gage resistance change into pounds depending on how the strain gages 22 are applied and how many foot structures are used—many variations being available. Preferably, four of the foot structures at the corners with strain gages on the upper surface of two beams 18 and strain gages on the lower surface of the remaining two beams all connected to a simple Wheatstone bridge as in U.S. Pat. No. 2,488,347 supra is the easiest or simplest arrangement.

In the compact and low profile sandwich structure thus described with the two sets of fulcrums that are differently spaced and equally offset i.e. the moment arms "a" being equal as shown in FIG. 4, it does not matter where the strain gages are placed along the beam as long as the moment arms "a" are equal and the strain gages are placed between the closer pair of fulcrums i.e. 20 as shown in FIG. 4. Thus, the strain gage 22 may be placed between fulcrums 20 at any position along the beam and the stress on that strain gage will be the same. Thus, the requirements are that the moment arms "a" be equal and the strain gages be placed anywhere along the beam between the closer fulcrums. Another advantage with the sandwich structure thus far described, is the fulcrums 16 and 20 may be made identical in size as may flat support plate 14 and beam plate 18, generally hard metallic load bearing components. Thus, the parts are completely interchangeable one with the other and it matters not how they are assembled.

Figure 2:
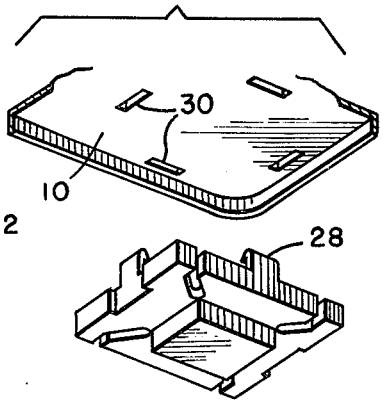
FIG. 2 is an exploded perspective of a single corner of the platform and the plastic housing of FIG. 1.

In order to apply load to the sandwich plates and fulcrums structure and support and clamp it together on the platform 10 and permit the overall low profile, an integral deformable plastic housing 26 encompasses the internal plates and fulcrums. Many suitable deformable materials such as Lexan polycarbonate or equivalent or even flexible metal may be used for housing 26 although a plastic is preferred. For locating the parts, the plastic housing 26 is integrally formed to support and clamp the plates and fulcrums together as shown in FIGS. 3 and 4. To this end, the sides of the plastic housing preferably include a plurality of vertical members with pawl-like ends, herein referred to as barbs 28 and, to engage the barbs, load platform 10 has suitably matching elongated slots 30 (FIG. 2) therein to secure or hold the sandwich together against platform 10 as in FIGS. 3 and 4. For transmitting and spreading the load, plastic housing 26 is formed with a support cup 32 and sloping flange 33 on the bottom which, because of the deformability is conformed to flatten under load along and against the support plate 14 as shown dotted in FIG. 4. This action spreads the barbs along the slots 30 to eliminate contact and prevent friction between the slots and barbs while still maintaining the entire sandwich together on load platform 10 and against support plate 14. For locating the fulcrums in proper position, the plastic housing side walls may be formed with paired grooves 34 and 36 to fix lower 16 and upper 20 fulcrums respectively in position in the sandwich although they could be reversed with fulcrums 16 being the closer pair while still maintaining the equal offset or moment arms "a".

While any scale outline may be used with a plurality of feet, the preferred form is a generally squarish outline of the conventional bathroom scale configuration that receives the four foot structures 12 peripherally spaced around the scale outline at each corner in a quadrate pattern.

Thus, the present strain gage scale, with its individual sandwich formed foot structures, permits an extremely low profile or thin scale with no moving parts if a digital readout is employed and lends itself to interchangeability of parts so that careful assembly is not required inasmuch as any of the feet 12 may be put at any corner and the internal sandwich structure may be interchanged without affecting the overall arrangement and reliability.

While I have hereinbefore shown a preferred form of the invention, obvious equivalent variations are possible in light of the above teachings such as variations in number of gages, location, orientation, and circuitry employed. It is therefore to be understood that, within the scope of the appended claims, the invention may be practiced otherwise than as specifically described, and the claims are intended to cover such equivalent variations.

I claim:

1. In a strain gage weighing scale with a load platform, a plurality of individually spaced foot structures supporting said platform, an improvement in each foot structure of a sandwich construction comprising,
    a bottom support plate,
    a pair of spaced first fulcrums on said plate,
    a floating beam plate on said first fulcrums and spaced above and substantially coextensive with said bottom plate,
    said plates being substantially flat, square, hard metallic plates and interchangeable in said sandwich,
    a pair of differently spaced and equally offset second fulcrums on said beam plate supporting said platform,
    strain gage means secured to said beam plate between the closer pair of fulcrums,
    means connected to said gage means converting the gage resistance change under load to read the weight of the load,
    an integral, deformable plastic housing supporting and securing the plates and fulcrums together,
    the sides of said plastic housing including a plurality of vertical barbs,
    elongated slots in said platform receiving said barbs locking said sandwich together against said platform, and
    a support cup on the bottom of said housing conformed to flatten under load along and against the support plate thus spreading the barbs along said slots to remove friction therebetween while maintaining said sandwich together on and against said support plate.

2. Apparatus as described in claim 1 wherein said scale overall outline is formed to receive four foot structures in a quadrate pattern peripherally spaced around the outline.

3. Apparatus as described in claim 2 wherein said plastic housing has paired bearing and locating grooves therein fixing each fulcrum in the sandwich.

* * * * *